Nov. 8, 1938.   C. J. CONN   2,136,041
METHOD OF AND APPARATUS FOR TREATING FOOD PRODUCTS
Filed March 18, 1937
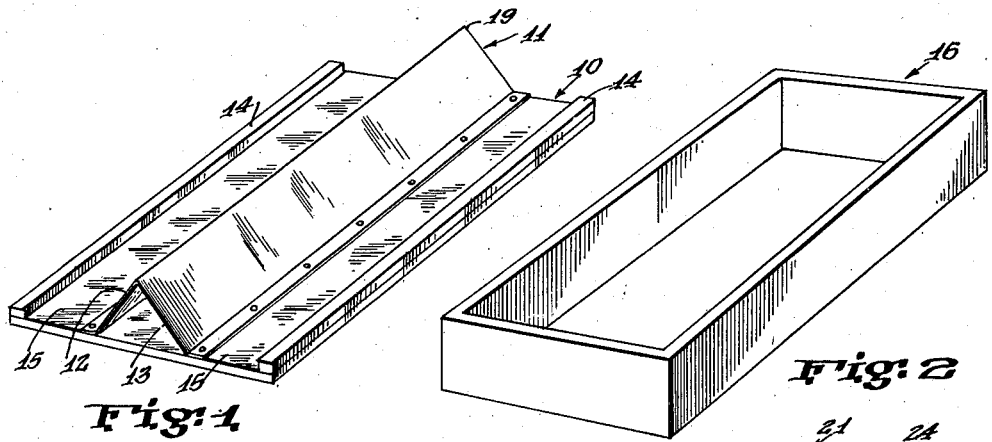
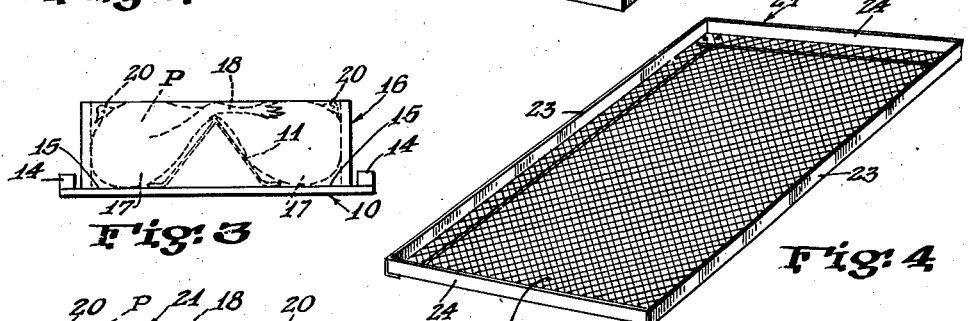
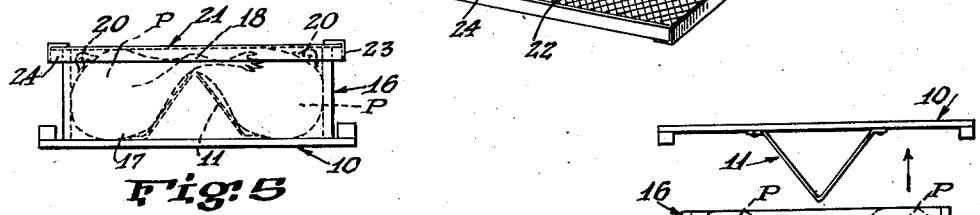
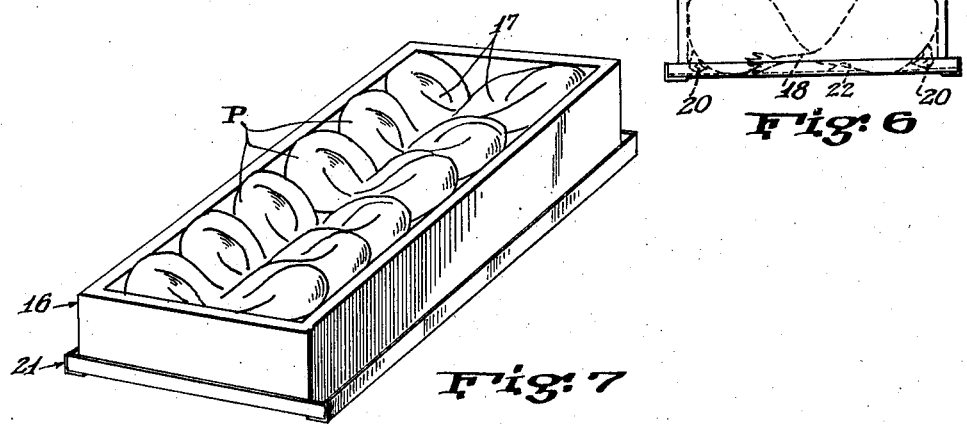
INVENTOR.
Chester J. Conn
BY
ATTORNEY.

Patented Nov. 8, 1938

2,136,041

UNITED STATES PATENT OFFICE 2,136,041

METHOD OF AND APPARATUS FOR TREATING FOOD PRODUCTS

Chester J. Conn, Smithtown Branch, N. Y.

Application March 18, 1937, Serial No. 131,556

7 Claims. (Cl. 17—44)

This invention relates to improvements in method of and apparatus for molding or framing poultry products to be frozen.

Up to the present time, considerable difficulty has been entailed in the packing of frozen poultry, particularly since present commercial trends require the presentation of the frozen product in orderly arrangement in a neatly appearing package. In the past, poultry was pre-treated prior to freezing in the usual manner and thereafter packed in barrels filled with ice and sent to the sharp freezer. The resulting frozen product when removed for use was frequently found bruised, in view of the frangibility of the bones or the pressure due to the weight of the remaining products in the barrel upon the lowermost products.

Broadly, it is an object of this invention to provide a novel method of and apparatus for molding food products of the character described, particularly poultry, whereby the same, as initially packed in the mold may, after freezing, be packed for storage and distribution in the position and contour established prior to freezing.

Specifically, it is an object of this invention to provide for a method of packing and a mold applied in such method, wherein the products, in the nature of poultry, are pre-set and molded to a pre-determined shape, whereby the resulting frozen product provides for a packing incorporating an even breast distribution and a uniformity of contour and assembly.

These and other advantages, capabilities and features of the invention will appear from the subjoined detailed description of one specific embodiment thereof illustrated in the accompanying drawing, in which Figure 1 is a perspective view of the base of the mold.

Figure 2 is a perspective view of the body of the mold.

Figure 3 is a front elevation of the mold as assembled with the interior thereof from one end shown in dotted lines.

Figure 4 is a perspective view of the screen or freezing support.

Figure 5 is a front elevation of the mold incorporating the freezing screen as assembled prior to turning, with the interior thereof from one end shown in dotted lines.

Figure 6 is a front elevation partially in section of the mold with the base removed, ready for freezing.

Figure 7 is a perspective view of the mold ready for the freezer.

Referring to the reference characters in the drawing, numeral 10 represents the base of the mold, the base being provided with an inverted V-shaped ridge formation 11, the walls 12 and 13 of which slope towards the base, and having upstanding parallel guide walls 14 at its opposite sides, the areas 15 between the legs of the ridge and the guide walls being flat. The body of the mold comprises a four-wall open ended assembly 16 of length equal to that of the base 10 and of slightly smaller width so that, as shown in Figure 3, the body may be disposed on the base and arranged so that it may have no lateral movement with respect to the base.

The products P, in this instance poultry, are packed, as shown in Figure 3, with the breasts 17 thereof disposed adjacent the flat areas 15 of the base and the legs 18 thereof extended horizontally over and across the apex 19 of the ridge formation 11, the neck and head portions 20 of the poultry P being disposed opposite to and in the same plane as the legs.

A freezing support 21 comprising a pervious screen 22 having side walls 23 in the form of angle bars and upstanding end walls 24, the said side and end walls being wider than the side and end walls of the body 16, is disposed on top of the body to form the assembly of Figure 5. The next step involves the inverting of the assembly of Figure 5 to the position shown in Figure 6, with the screen freezing support serving as the bottom of the unit. The base 10 is withdrawn by upward displacement, as shown in Figure 6, to provide the desired freezing mold.

At this juncture, as shown in Figure 7, the breasts 17 of the poultry are exposed and a V-notch spacing zone formed between the respective products, the legs 18 and the head and neck portions 20 being adapted to rest on the screen 22 of the freezing support.

The mold as assembled is then placed in a freezer room where refrigerant spray may be discharged against the exposed surfaces of the poultry carried in the mold, both from the open top and through the screen 22 of the open bottom.

Although, as shown in the drawing, the body 16 is intended to be removed after freezing, and the frozen products packed in a shipping box or carton, it is within the province of this invention to retain body 16 as the permanent side frame for the shipping package and to merely fasten separate tops and bottoms to the same to form a complete enclosure.

It is pointed out that the packed frozen products, whether by insertion of the same into a particular shipping box or carton or by using the body 16 of the mold and fastening top and bottom covers on the same, have, by virtue of the application and method of this mold assembly, attained a regularity of position and contour and pleasant appearance so that display and sale may be made of the same directly from the pack.

It is obvious that various changes and modifications may be made to the details of construction without departing from the general spirit of the invention as set forth in the appended claims.

I claim:

1. A method of assembling food products of the class described for freezing, comprising disposing an open ended frame on a base having a shaping member, packing individual products between the shaping member and the walls of the frame, disposing a screen over the remaining open end of the frame, inverting the assembly and removing the base and the shaping member therefrom, whereby exposed surfaces of the food products are disposed at the top and bottom of said assembly for direct contact with the refrigerant.

2. A method of treating food products of the class described, comprising disposing a frame having open top and bottom on a base having a central upstanding ridge, packing individual poultry on opposite sides of the ridge and with portions of the body thereof resting against the respective slopes of the ridge, with the breast of the poultry resting against the base and the legs of the poultry extending horizontally across the apex of the ridge, disposing a screen over the open top of the frame, inverting the assembly and removing the base therefrom, whereby to provide exposed surfaces of the poultry at the top and bottom of the assembly for contact with the refrigerant.

3. A method of treating food products of the class described, comprising disposing a frame having open top and bottom on a base having a central upstanding ridge, packing individual poultry on opposite sides of the ridge and with portions of the body thereof resting against the respective slopes of the ridge, with the breast of the poultry resting against the base and the legs of the poultry extending horizontally across the apex of the ridge, disposing a screen over the open top of the frame, inverting the assembly and removing the base therefrom, whereby the breast of the poultry is exposed at the top of the mold adjacent an unoccupied zone in the nature of a V-notch between opposing sets of poultry.

4. A mold for treating food products being frozen, comprising a base, an upstanding ridge formation disposed along the length and intermediate of said base, a separable side wall formation disposed on the base and serving to form an enclosure for said ridge formation and a separable freezer screen disposed over and mounted on the top of said side wall formation.

5. A mold for treating food products being frozen, comprising a base, an upstanding ridge formation disposed on said base, a side wall formation disposed on the base and serving to form an enclosure for said ridge formation and a freezer screen disposed over the top of said side wall formation, said base, side wall formation and screen formation being separable units and said mold prior to disposition in the freezing chamber being invertible and the base being adapted to be removed, whereby refrigerant may be discharged into the mold from the open top and the screen bottom thereof.

6. A mold for treating food products being frozen, comprising a base, an upstanding ridge formation disposed on said base, a wall formation along the sides of said base, an open ended body disposed on the base within the side walls and serving to form an enclosure for said ridge formation and a surface area of the base between the ridge formation and said body and a freezer screen adapted to be disposed over the top of said body, said mold being adapted to be inverted and said base and ridge formation disposed thereon being removable prior to freezing.

7. A mold for treating food products being frozen, comprising a base having an upstanding ridge formation, an open ended body disposed on said base and serving to form an enclosure for said ridge formation, in which enclosure food products may be shaped, and a freezer screen disposed over the top of said body, said mold being inverted and the base and ridge formation carried thereon being removed, thereby to provide a substantially open top and bottom for direct contact of the food products contained therein with refrigerant.

CHESTER J. CONN.